United States Patent
Petkov

(10) Patent No.: US 8,030,905 B2
(45) Date of Patent: Oct. 4, 2011

(54) ISOLATED GENERATOR CONTROL UNIT (GCU)

(75) Inventor: Plamen Petkov, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 665 days.

(21) Appl. No.: 12/171,174

(22) Filed: Jul. 10, 2008

(65) Prior Publication Data

US 2010/0007312 A1    Jan. 14, 2010

(51) Int. Cl.
*H02H 7/06* (2006.01)
*H02P 11/00* (2006.01)
*H02P 9/00* (2006.01)

(52) U.S. Cl. .......................... 322/46; 322/44

(58) Field of Classification Search .............. 322/46, 322/44, 59, 89, 24, 28
See application file for complete search history.

(56) References Cited

U.S. PATENT DOCUMENTS

| | | | | |
|---|---|---|---|---|
| 3,473,039 A * | 10/1969 | Fegley | ............... | 307/11 |
| 5,065,104 A * | 11/1991 | Kusko et al. | ............... | 324/508 |
| 5,126,658 A * | 6/1992 | Twerdochlib | ............ | 324/765.01 |
| 5,392,218 A | 2/1995 | Emmerich | | |
| 6,130,398 A * | 10/2000 | Schneider et al. | ....... | 219/121.39 |
| 6,936,996 B2 | 8/2005 | Uematsu | | |
| 7,629,836 B2 * | 12/2009 | Kull et al. | ...................... | 327/552 |
| 2001/0048310 A1 * | 12/2001 | Takahashi | ..................... | 324/551 |

* cited by examiner

*Primary Examiner* — Julio C. Gonzalez R.
(74) *Attorney, Agent, or Firm* — Miriam Jackson, Esq.

(57) ABSTRACT

An apparatus and method for allowing continuous operation of a generator control unit (GCU) despite a ground fault short circuit is disclosed. More specifically, a generator control unit (GCU) that maintains an isolated power pass domain in a completely floating set up with respect to the ground referenced control domain is used to allow continuous operation of a generator control unit (GCU) even when an internal wiring such as a permanent magnet generator wire or a generator field coil wire comes in contact with the chassis due to failure of the insulation. In addition, the apparatus and method also utilizes a high ohmic resistor as the only connection between the isolated power pass domain and the ground referenced control domain to control the voltage spike that occurs during a ground fault short circuit. Finally, the apparatus and method is also capable of detecting the occurrence of a ground fault short circuit by utilizing a ground fault detection to detect a disbalance current passing through a high ohmic resistor.

12 Claims, 3 Drawing Sheets

ISOLATED GENERATOR CONTROL UNIT (GCU)

BACKGROUND OF THE INVENTION

The current invention generally relates to a generator control unit (GCU), and more particularly, to a generator control unit (GCU) that is capable of tolerating a ground fault in the generator, be that in the permanent magnet generator (PMG) wiring or field wiring This generator control unit (GCU) can tolerate a ground fault that commonly results from the incidental contact of the permanent magnet generator (PMG) wire or a field coil wire with the chassis of the generator.

It is generally known that power generators require a generator control unit (GCU) to control their output. In order to control the generator output, the field current is adjusted to compensate for the load and speed variations. The field current is commonly derived from a permanent magnet generator (PMG), which is incorporated into the generator itself.

A common problem that occurs in these generator control unit (GCU) is a ground shortage that occurs when the electrical wires touch the chassis as a result of insulation breakdown. This ground shortage is undesirable as such shortage causes the system to stop operation completely at the same time potentially damaging expensive electrical components within the generator control unit (GCU).

Typically, the ground shortage issues can occur in permanent magnet generator (PMG) wire or in a field coil wire. Although deriving from two separate components, the shortage caused when either of these wires touches the chassis could be significantly detrimental to the continuous operation of an aircraft power generation system by damaging its generator and its generator control unit (GCU).

FIG. 1 shows a prior art embodiment wherein the electrical components are connected directly to the ground referenced control domain, hence making it difficult to tolerate an electrical shortage to the chassis.

FIG. 1 shows a direct connection from inverted buck regulator 106 to ground referenced control domain 112. During a ground fault when a metal wire touches the chassis at a second location other than the intended ground connection 111, a short circuit will occur, creating an undesirable over-current. The sudden spike in current could be detrimental to the operation of the generator control unit (GCU), often causing the entire system to shut down.

As it can be seen from FIG. 1, the traditional prior art generator control unit (GCU) is not set up to withstand the ground fault caused when a permanent magnet generator (PMG) 100 wire or a field coil 108 wire come in touch with the chassis.

In order to address the ground shortage issues deriving from the permanent magnet generator (PMG) wire shorting with the chassis, the current art sometimes attaches a heavy, bulky, and burdensome component called a permanent magnet generator transformer (PMG transformer) to isolate the input. These permanent magnet generator transformers (PMG transformers) have to be rated for the full power of the permanent magnet generators (PMG) that they are attached to making them expensive in addition to being heavy, bulky, and burdensome.

In order to address the ground shortage issues deriving from the field coil wire shorting with the chassis, the current art lacks a suitable solution other than to add an additional isolator that can withstand the sudden spike in voltage. Consequently, without the additional isolator, the entire controlled frequency generator (CFG) will stop and shut down when the field coil wire touches the chassis.

Hence, it can be seen that there is a need for an innovative system and method for providing continuous operation of a generator control unit (GCU) in the event of a ground short to the chassis from either a permanent magnet generator (PMG) wire or from a field coil wire without the need of heavy and burdensome isolators that are unnecessarily expensive. Moreover, there is also a need for an innovative system and method to be able to detect such a ground short to the chassis despite the continuous operation for future maintenance.

SUMMARY OF THE INVENTION

In one aspect of the present invention, a generator control unit comprises a ground referenced control domain connected to a ground chassis, an isolated power pass domain controlled by the ground referenced control domain, a permanent magnet generator connected to the isolated power pass domain to provide a power, and a generator field coil connected the isolated power pass domain; wherein the connection between the isolated power pass domain and the ground referenced control domain is floating with respect to the ground referenced control domain.

In another aspect of the invention a method of controlling a ground fault within a generator control unit comprises connecting a ground referenced domain to a ground chassis, connecting an isolated power pass domain to the ground referenced domain, connecting a permanent magnet generator to the isolated power pass domain, connecting a generator field coil to the isolated power pass domain, and floating the isolated power pass domain with respect to the ground referenced control domain.

In a further aspect of the invention, a generator control unit capable of tolerating a ground fault comprises a ground referenced control domain connected to a ground chassis, a high ohmic resistor connected to the ground referenced control domain, and an isolated power pass domain connected to the high ohmic resistor; wherein the isolated power pass domain is floating with respect to the ground referenced control domain.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below. The current invention of an isolated generator control unit (GCU) is suitable to be placed in an aircraft context wherein the variable speed of the electrical power generator is dependent on the operational speed of the main aircraft engine. However, many numerous other contexts where a generator control unit is used can be contained as embodiments of the current invention without departing from the scope of the present invention.

The present invention generally provides an isolated power pass domain within a generator control unit (GCU) that is connected in a completely floating manner with respect to the ground referenced control domain. The completely floating connection allows the isolated power pass domain to continue operation in the event of an electrical shortage with the chassis. This is unlike the prior art generator control unit (GCU) where the electrical components are connected directly to the ground referenced control domain, causing the entire system to shut down in the event of an electrical shortage with the chassis.

Figure 1:
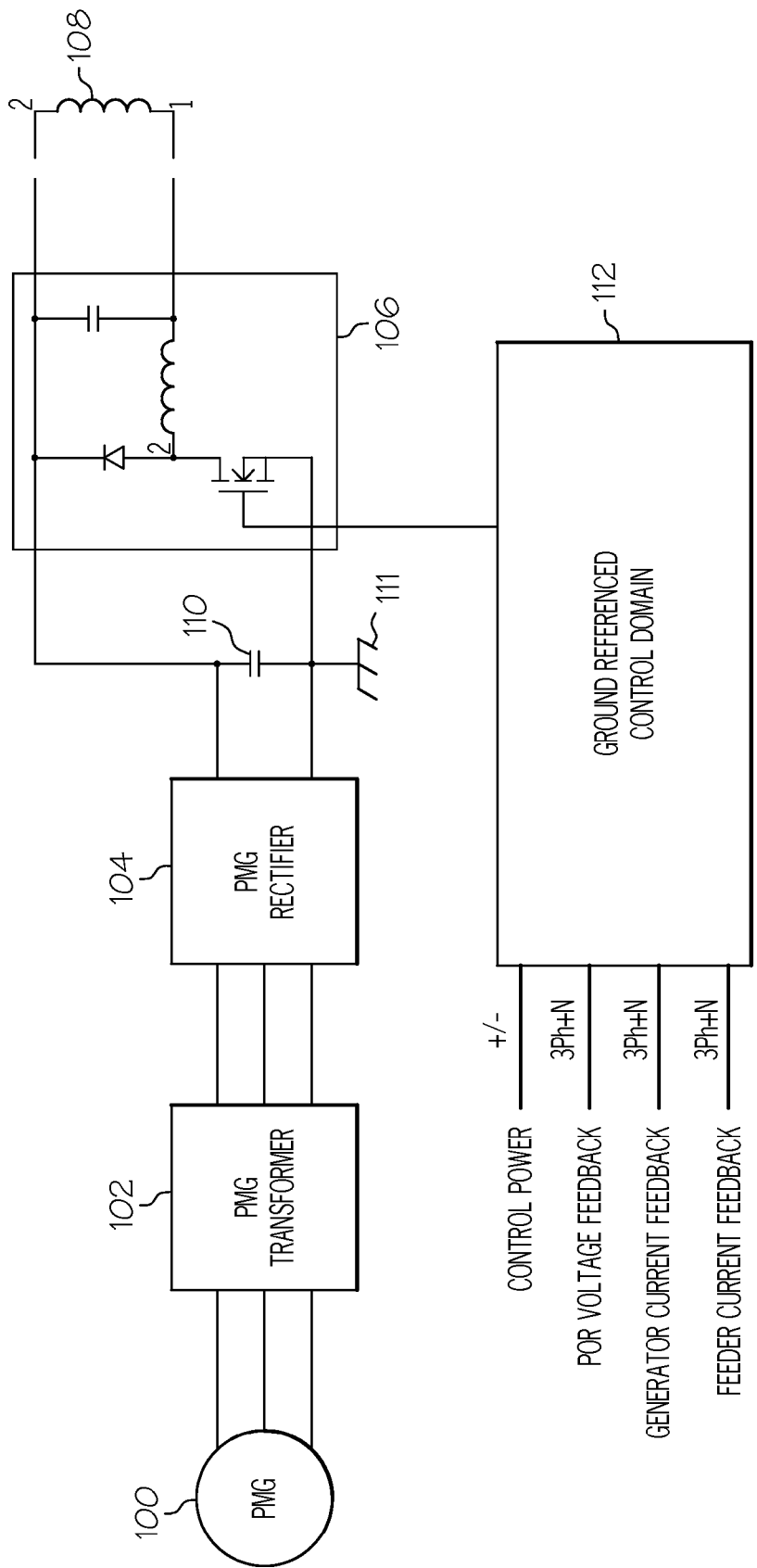
FIG. 1 is a functional block diagram of the prior art generator control unit (GCU)
Figure 2:
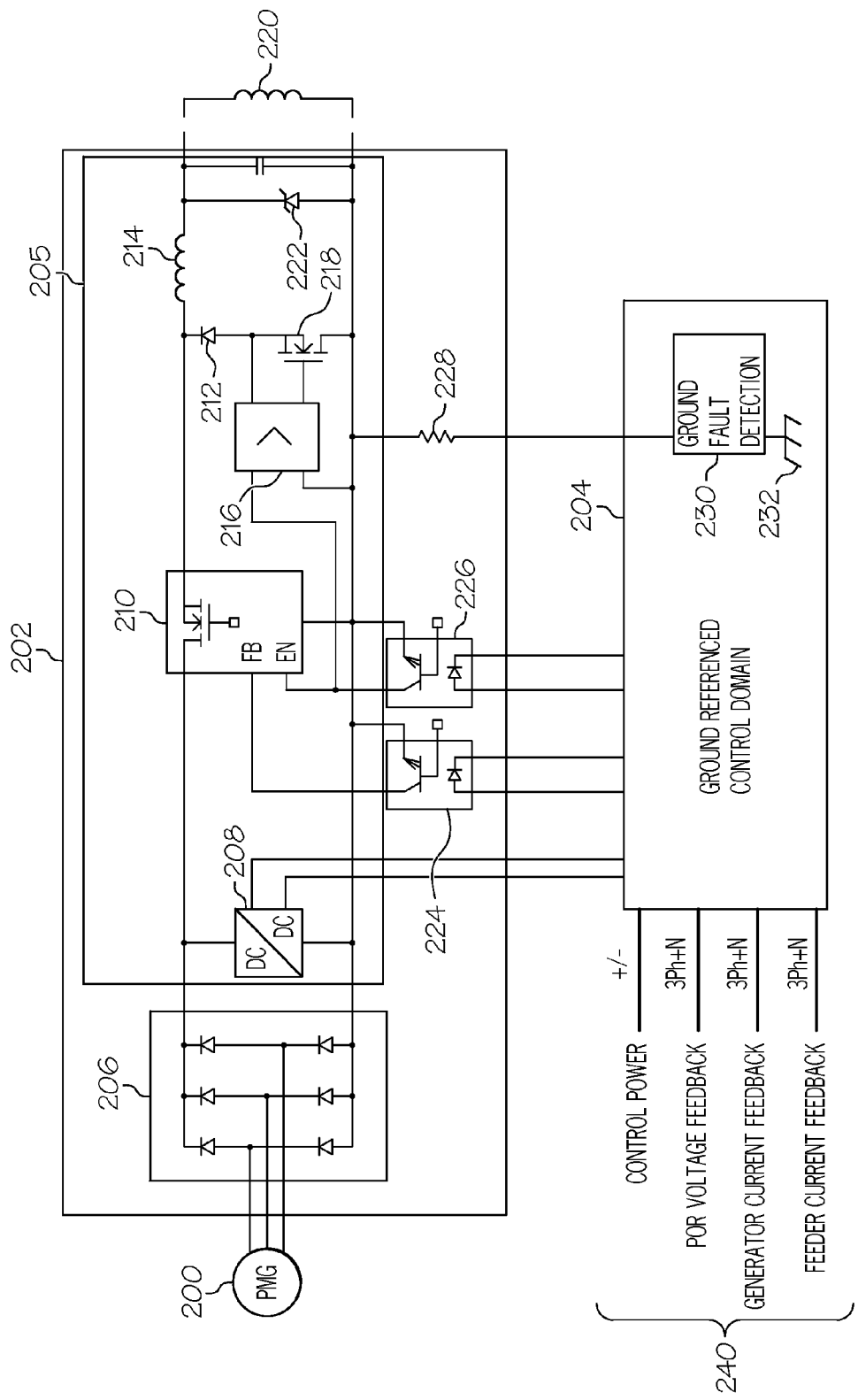
FIG. 2 is a functional block diagram of one embodiment of the current invention with an isolated generator control unit (GCU)

FIG. 2 shows a functional schematic block diagram of the current exemplary generator control unit (GCU) for an aircraft. It should be understood that the current invention, although shown in the exemplary embodiment of an aircraft generator control unit, could also be applicable to aerospace systems, industrial environments, electromechanical vehicles, or any other electrical system without departing from the scope of the present invention.

FIG. 2 of the current exemplary embodiment may contain a permanent magnet generator (PMG) 200 as well as a generator field coil 220 connected to an isolated power pass domain 202 that may floating with respect to the ground referenced control domain 204. Within the isolated power pass domain 202 may be a permanent magnet generator rectifier (PMG Rectifier) 206, a buck converter unit 205, a pair of opto-isolators 224 and 226, as well as a high ohmic resistor 208. Buck converter unit 205 may further contain additional components such as the DC/DC converter 208, a buck regulator 210, a fly-wheeling diode 212, a buck inductor 214, a gate driver 216, an over-voltage protection switch 218, and a transorb 222. Isolated power pass domain 202 may also contain two opto-isolators 224 and 226, as well as a high ohmic resistor 228. Finally, the ground referenced control domain 204 may contain two essential elements named ground fault detection 230 and a ground connection 232.

First and foremost, it is worth noting that in this current exemplary embodiment the isolated power pass domain 202 may be completely floating by not being directly connection to the ground referenced control domain 204. The ground connection 232 may be located only in the ground referenced control domain 204, wherein the high ohmic resistor 228 serves as the only ground connection with the isolated power pass domain 208. The high ohmic resistor 208 could provide sufficient resistance to the voltage spike in the event of an electrical short to allow the generator control unit (GCU) to continue to operate.

Permanent magnet generator (PMG) 200, in this current exemplary embodiment could be the source of the control and excitation power within the generator. This permanent magnet generator (PMG) 200 may be used to provide the excitation voltage to regulate the point of regulation voltage by adjusting the field current to compensate for load and speed variations. The permanent magnet generator (PMG) 200 in this exemplary embodiment may also contain electrical wires internally that may be protected from the chassis by a layer of insulation. When the insulation fail, the electrical wires within the permanent magnet generator (PMG) 200 may touch the chassis, which in turn creates a ground fault.

Although a permanent magnet generator (PMG) 200 may be used in this current exemplary embodiment, other variations of power generators that are capable of producing electrical energy can also be used without departing from the scope of the present invention.

The isolation of a voltage spike may be achieved by keeping the isolated power pass domain 202 completely floating with respect to the ground referenced control domain 204. This floating arrangement may allow the isolated power pass domain 202 to continue operation even in the event of a ground fault without the need for a heavy, bulky and burdensome permanent magnet generator transformer (PMG Transformer).

Isolated power pass domain 202 in this current exemplary embodiment may be connected between the permanent magnet generator (PMG) 200 and the generator field coil 220 to function as essentially a step down or buck DC/DC converter for the generator control unit (GCU). The isolated power pass domain 202 may operate entirely in a floating state with respect to the ground connection 232 within the ground referenced control domain 204 to provide the isolation.

Ground referenced control domain 204 in this current exemplary embodiment may be connected to isolated power pass domain 202 via the high ohmic resistor 228. Ground referenced control domain 204 may also derive its power from the DC/DC converter 208 as the power may be generated from the permanent magnet generator (PMG) 200 to power the main power controller section 240.

The buck converter unit 205 may perform the function of a step down or buck DC/DC converter in reducing the voltage of the permanent magnet generator (PMG) 200 under the control of the ground referenced control domain 204, which in turn may be connected to the chassis and provides controlling capabilities of the generator.

Permanent magnet generator rectifier (PMG Rectifier) 206 in this current exemplary embodiment may be connected to the permanent magnet generator 200 and the permanent magnet rectifier (PMG Rectifier) 206 may be used to convert alternating current (AC) to a direct current (DC) containing an average value proportional to the input speed. It is worth noting that the permanent magnet generator rectifier (PMG Rectifier) 206 may create noises and ripples that are byproducts of the AC to DC conversion. In order to address the noise and ripple issues, the current invention may utilize a control loop and a buck converter unit 205 to counter the effect of the ripple in the rectified voltage, eliminating the need of storage cap. The removal of the storage cap in turn would allow the PMG rectifier currents to become continuous. i.e. will reduce the emissions from the PMG wires. The common mode emissions would further be reduced by the floating nature of the isolated power pass domain 202.

DC/DC converter 208 in this current exemplary embodiment may be connected to the permanent magnet generator rectifier 206 and may utilize a fraction of the electrical energy generated by the permanent magnet generator (PMG) 200 to power the ground referenced control domain 204.

Buck regulator 210 in this current exemplary embodiment may be used to compare the actual field current to an internal fixed reference voltage, offset by a current command, coming through the opto isolator 224 from the ground referenced control domain 204. The filed current command is generated in the ground referenced domain, based on comparison of Point of Regulation (POR) voltage feedback with internal reference. The buck regulator 210 may have a feedback voltage and an enabling voltage input coming from the ground referenced control domain 204 via opto-isolators 224 and 226 respectively. The feedback input may be used for duty cycle control of the buck regulator 210 as to enforce a field current, that is proportional to the current command from the isolated power pass domain 202. The enable input may be used to enable/disable regulation and to enforce over-voltage protection by shutting the buck regulator 210 and the over voltage protection switch 218.

Fly-wheeling diode 212 in this current exemplary embodiment may be connected to the input of buck regulator 210, and may be used to direct magnetic energy, stored in the buck inductor 214 during on time and to the field coil during off time The fly-wheeling diode 212 may allow for the field current to be continuous despite the On/Off operation of the buck regulator 210.

Buck inductor 214 in this current exemplary embodiment may be part of buck converter unit 205, and may serve the purpose storing energy to be passed into the buck converter unit 205 depending on the buck regulator 210. Buck inductor 214 may be used to allow the amount of power to and from the permanent magnet generator to be controlled.

Gate driver 216 in this current exemplary embodiment may be connected to the over voltage protection switch 218. Gate driver 216 may be connected to the output of the buck regulator 210 and the enabling opto-isolator 226 to control the electrical energy into the over voltage protection switch 218.

Over voltage protection switch 218 may be connected to the output of gate driver 216 and may serve the purpose of breaking the current path through the fly-wheeling diode 212 upon over-voltage detection. Opening of the flywheel path may force the generator field coil 220 to dissipate energy at a higher voltage, limited by the transorb 222, causing the generator field coil 220 current to decay at a faster rate, limiting the over-shoot at the POR voltage during load off transients.

Generator field coil 220, in this current exemplary embodiment may be a magnetic field component containing field wires being wound together at either the rotor or the stator. Generator field coil 220 may be attached to buck converter unit 205 to allow the continuous operation of the generator control unit (GCU). The field wires within generator field coil 220 may be another source of a ground shortage when the wires of the filed coil 108 come in contact with the chassis.

Transorb 222 in the current exemplary embodiment refers to a transient voltage suppression diode and may be connected in parallel to generator field coil 220 to protect the sensitive electric components within the generator control unit (GCU) from damages in the event of a over-voltage protection intervention by the switch 218.

Opto isolator 224 in this current exemplary embodiment may connect the feedback of the buck regulator 210 to the ground referenced control domain 204 to provide a current command to the isolated power pass domain 202. Opto isolator 224 may utilize a short optical transmission path to transfer a signal while keeping the isolated power pass domain 202 isolated from the ground referenced control domain 204 to prevent damage occurring from an electrical short.

Opto isolator 226 may function in the same way as opto isolator 224 in keeping the isolated power pass domain 202 from the ground referenced control domain 204, but is directed towards providing the enabling command to the buck regulator 210.

High ohmic resistor 228 in this current exemplary embodiment is an essential component of the current invention in creating the only connection between isolated power pass domain 202 and ground referenced control domain 204. Because only the ground referenced control domain 204 contains a ground connection 232, by utilizing the high ohmic resistor 228 as the only connection to the isolated power pass domain 202, the high ohmic resistor 228 keeps the entire power pass domain 202 floating with respect to the ground referenced control domain 204. This floating configuration may allow the generator control unit (GCU) to continue operating even if there is an electrical short that stems from the permanent magnet generator wire or the field coil wire touching the chassis. When such an electrical short occurs, a ground loop is formed through the high ohmic resistor 228 allowing its current into the ground connection 232 to be detected as an indication of the ground fault. The high ohmic resistor 228 also limits the current in the ground loop as to allow continuous operation of generator control unit (GCU) despite the ground fault in the generator.

Under normal operating conditions, the high ohmic resistor may carry no current because the isolated power pass domain 202 could be completely floating and isolated with respect to the ground referenced control domain 204. However, because the isolated power pass domain 202 could be completely floating, static charging occurs as a result of a fully floating architecture, and the high ohmic resistor 228 may serve the additional purpose of absorbing the static charging during normal operating conditions without departing from the scope of the present invention.

Ground fault detection 230 in this current exemplary embodiment may be located in the ground referenced control domain 204 and serves as the only connection to the high ohmic resistor 228 and the isolated power pass domain 202. Ground fault detection 230 may serve the purpose of detecting a current that flows through the high ohmic resistor 228 as a result of an electrical short. This allows the detection of the occurrence of an electrical short despite continuous operation of the generator control unit (GCU).

Finally, ground connection 232 here in the current exemplary embodiment refers to the general ground voltage of zero. This ground connection 232 may refer to an intentional grounding point within the ground referenced control domain 204 as indicated in FIG. 2, but could refer to any location in the chassis where a ground could occur without departing from the scope of the present invention. The ground connection 232 in this current exemplary embodiment may connected to the ground fault detection 230 to allow detection of the electrical short coming from the isolated power pass domain 202.

Figure 3:
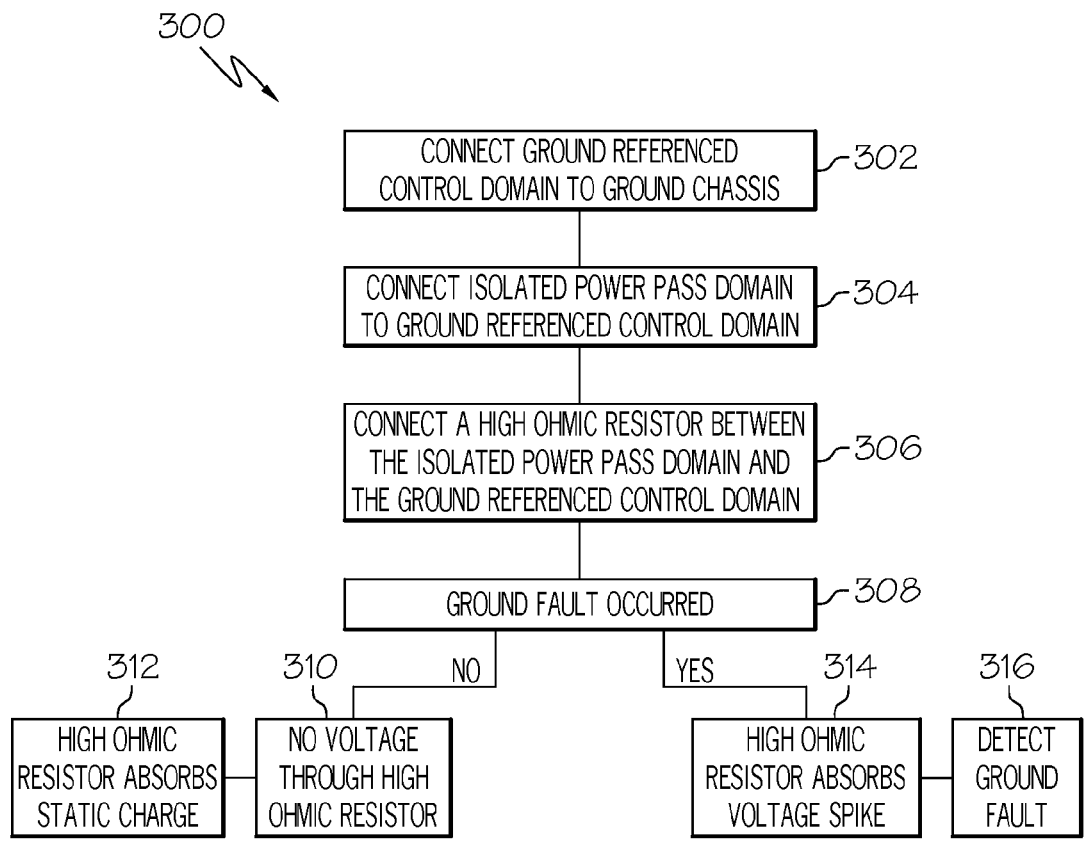
FIG. 3 shows a flow chart of the current invention.

FIG. 3 shows a flow chart according to an embodiment of the present invention.

The generator control unit (GCU) of the current exemplary embodiment functions by connecting a ground referenced control domain to ground chassis at step 302. Subsequent to step 302, an isolated power pass domain may be connected to the ground referenced control domain at step 304. It should be noted that the connection between isolated power pass domain and ground referenced control domain at step 304 may be in a floating arrangement in accordance with the exemplary embodiment of the present invention. This floating arrangement allows the generator control unit (GCU) to continue operating in the event of a ground fault.

At step 304, a high ohmic resistor may be connected between the isolated power pass domain and the ground reference control domain to limit the current into the ground loop, formed between the ground fault point and the intentional ground connection 232 during ground fault condition.

At step 308, the generator control unit may determine whether a ground fault has occurred. If no ground fault has occurred, the generator control unit (GCU) may go through steps 310 and 312. At step 310, a voltage may not pass through high ohmic resistor when there is no ground fault, and at step 312, the high ohmic resistor also may serve the purpose of absorbing static charge.

If there is a ground fault at step 308, then the generator control unit (GCU) may pass through steps 314 and 316. At step 314, the high ohmic resistor absorbs a voltage spike that may generally associated with a ground fault, allowing the continuous operation of generator control unit (GCU). Additionally, during the existence of a ground fault, at step 316, the generator control unit (GCU) may also be capable of detecting a ground fault for subsequent maintenance purposes.

It should be understood, of course, that the foregoing relates to exemplary embodiments of the invention and that modifications may be made without departing from the spirit and scope of the invention as set forth in the following claims.

I claim:

1. A generator control unit comprising:
   a ground referenced control domain connected to a ground chassis;
   an isolated power pass domain controlled by said ground reference control domain;
   a permanent magnet generator connected to said isolated power pass domain to provide a power;
   a generator field coil connected to said isolated power pass domain;
   a permanent magnet generator rectifier connected to said permanent magnet generator;
   a buck converter unit connected to said generator field coil; and
   a high ohmic resistor connected to said buck converter unit,
   wherein said high ohmic resistor is used to connect said isolated power pass domain to said ground referenced control domain, and
   wherein said isolated power pass domain is floating with respect to said ground referenced control domain.

2. The generator control unit of claim 1, wherein said high ohmic resistor limits a current through said high ohmic resistor allowing said isolated power pass domain to operate undisturbed during a ground fault.

3. The generator control unit of claim 2, wherein a disbalance current flow passes through said high ohmic resistor during said ground fault.

4. The generator control unit of claim 3, wherein said ground referenced control domain further comprises:
   a ground fault detection unit connected to said high ohmic resistor; and
   a ground connection connected to said ground chassis;
   wherein said disbalance current flows detected by said ground fault detection unit.

5. The generator control unit of claim 4, wherein said high ohmic resistor absorbs a static charge from said isolated power pass domain that is floating with respect to said ground referenced control domain.

6. The generator control unit of claim 5, wherein said ground fault occurs when an insulation within said generator control unit breaks down and a wire within said permanent magnet generator touches said ground chassis of said generator control unit.

7. The generator control unit of claim 5, wherein said ground fault occurs when an insulation within said generator control unit breaks down and a wire within said generator field coil touches said ground chassis of said generator control unit.

8. The generator control unit of claim 5, wherein said buck converter unit eliminates a ripple associated with a voltage produced by said permanent magnet generator rectifier.

9. The generator control unit of claim 8, wherein said buck converter unit further comprises of a DC/DC converter wherein said DC/DC converter provides power to said ground referenced control domain.

10. A method of controlling a ground fault within a generator control unit comprising:
    connecting a ground referenced domain to a ground chassis;
    connecting an isolated power pass domain to said ground referenced domain using a high ohmic resistor;
    connecting a permanent magnet generator to said isolated power pass domain;
    connecting a generator field coil to said isolated power pass domain;
    floating said isolated power pass domain with respect to said ground referenced control domain;
    limiting a current through said high ohmic resistor resulting from said ground fault allowing said isolated power pass domain to operate undisturbed; and
    detecting a ground fault when a disbalance current flow passes through said high ohmic resistor to a ground fault detection unit within said ground referenced control domain, said disbalance current flow occurring when an insulation within said generator control unit breaks down and a wire within said generator control unit touches said ground chassis.

11. The method of claim 10, further comprising of absorbing a static charge from said isolated power pass domain that is floating with respect to said ground referenced control domain.

12. A generator control unit capable of tolerating a ground fault comprising:
    a ground referenced control domain connected to a ground chassis;
    a high ohmic resistor connected to said ground referenced control domain; and
    an isolated power pass domain connected to said high ohmic resistor;
    wherein said isolated power pass domain is floating with respect to said ground referenced control domain,
    wherein said high ohmic resistor limits a current from said isolated power pass domain to said ground referenced control domain during a ground fault, and
    wherein said high ohmic resistor absorbs a static charge from said isolated power pass domain that is floating with respect to said ground referenced control domain.

* * * * *